United States Patent
Furukawa et al.

(10) Patent No.: US 6,225,708 B1
(45) Date of Patent: May 1, 2001

(54) UNINTERRUPTABLE POWER SUPPLY

(75) Inventors: Noboru Furukawa, Ayase; Keiji Suzuki, Fujisawa, both of (JP)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/274,676

(22) Filed: Mar. 24, 1999

(30) Foreign Application Priority Data

Jun. 5, 1998 (JP) ................................. 10-157662

(51) Int. Cl.[7] ........................................ H02J 7/00
(52) U.S. Cl. ............................ 307/66; 307/23; 307/46
(58) Field of Search .............................. 307/45, 46, 58, 307/64, 65, 66, 23, 80

(56) References Cited

U.S. PATENT DOCUMENTS

| | | | |
|---|---|---|---|
| 4,709,318 | * 11/1987 | Gephart et al. | 363/37 |
| 5,886,424 | * 3/1999 | Kim | 307/64 |
| 5,990,577 | * 11/1999 | Kamioka et al. | 307/26 |
| 6,075,345 | * 6/2000 | Lee | 320/138 |

* cited by examiner

Primary Examiner—Josie Ballato
Assistant Examiner—Robert L. DeBeradinis
(74) Attorney, Agent, or Firm—Anthony Magistrale; J. Bruce Schelkopf

(57) ABSTRACT

Disclosed is an integrated uninterruptable power supply (UPS) for a computer powered by a commercial power supply. The uninterruptable power supply is operative to feed power from a normal power supply to a first load to be operated at a first DC voltage and a second DC voltage that is lower than the first DC voltage. If a characteristic of the normal power supply is deviated from a defined value, the UPS of the present invention will continue feeding power from a battery power supply to the first load. The uninterruptable power supply includes a power supply unit, having an output connected to the first load, for converting a voltage of the normal power supply to the first DC voltage and for outputting the same. The UPS also includes a first voltage converter having an input connected to the battery and an output connected to the first load, for converting an output voltage of the battery to the second DC voltage and for outputting the same. If the normal power supply is within the defined value, the first voltage converter waits in a no-load state.

10 Claims, 5 Drawing Sheets

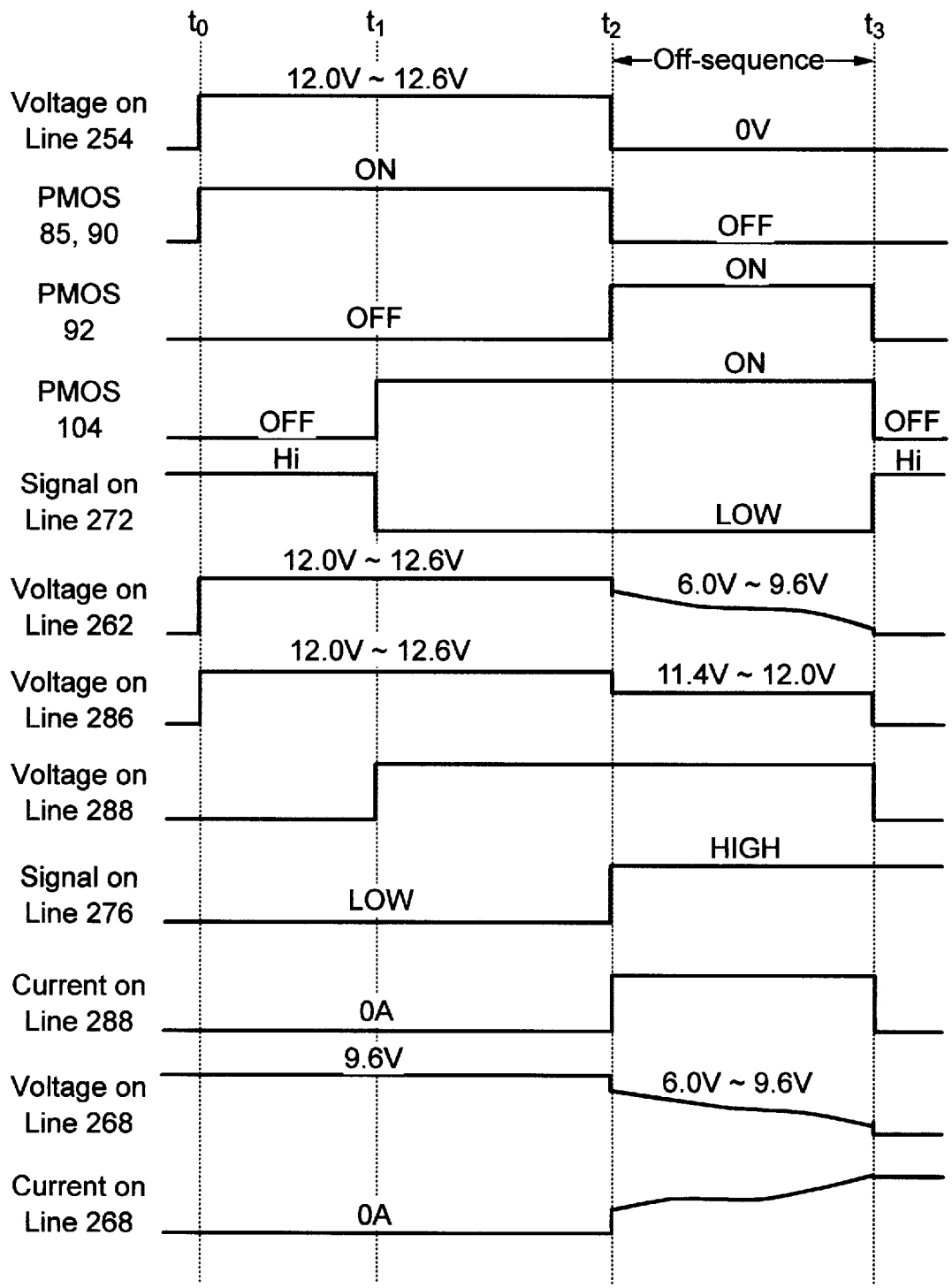

UNINTERRUPTABLE POWER SUPPLY

BACKGROUND OF THE INVENTION

1. Field of the Invention

This invention relates to an uninterruptable power supply (UPS) provided internally to an electronic device and, more particularly, to such a UPS for directly feeding a direct current (DC) voltage generated by rectifying a voltage of a normal power supply to a load without intervention of any voltage converter and, if a disturbance occurs in the normal power supply, for backing up the DC voltage by a power supply such as a battery or the like other than the normal power supply.

2. Description of Related Art

A desktop computer (hereafter simply called "computer") consumes a relatively large amount of power and, thus, it generally uses a commercial power supply of alternating current (AC) as a normal power supply. Many electronic components operating inside the computer, such as processors, memories, disk drives and the like, operate at DC voltages generated by rectifying AC. During operation of the computer, a program and data are temporarily stored into a main memory (RAM) for executing designated tasks. All data created by such work is stored in a main memory but it cannot maintain the stored data when a power loss occurs. Accordingly, in the event that a task performed in the computer is finished before the computer is powered-off, it is necessary to save the data stored in memory into a magnetic disk, a floppy disk or the like. Also, in a case where a number of programs are running, it is desirable to terminate the programs in a predetermined order to stop the computer.

Since DC voltages fed to electronic components in a computer are generated by rectifying AC of the commercial power supply, they may vary due to a power interruption (power failure), an instantaneous voltage drop, a frequency fluctuation or the like. Each electronic component in a computer has a predetermined allowable range (tolerance) for a DC voltage variation respectively to maintain its normal operation. Thus, for normal operation of a computer, it is necessary to continually feed voltages that come within the respective allowable ranges to these electronic components. This is because a sudden occurrence of a voltage or frequency disturbance in the commercial power supply may lead to a malfunction of an electronic component or a loss of working data in a memory, which may result in significant damage to a user's work.

In order to cope with this problem in a computer, a UPS has been customarily provided between the commercial power supply and the computer. Such a UPS is provided with a rechargeable battery, a charger and an inverter for DC/AC conversion. When the commercial power supply is available, it converts AC of the commercial power supply to DC and then, further converts its output to AC for feeding the same to the computer, whereas the charger performs supplementary charge to compensate for natural discharge. If a power interruption occurs, a DC voltage of the battery is converted to AC through the inverter for feeding it to the computer. Since a battery terminal is always connected to an input of the inverter, an output of the inverter remains constant even when feeding power to the inverter is instantaneously switched from the commercial power supply to the battery. The battery requires a minimum capacity that allows the computer to be normally operated for a time period which starts from detection of a power interruption by the computer (or an operator) and ends at completion of an off-sequence for stopping the computer in a predetermined procedure.

In FIG. 1, there is shown a schematic block wiring diagram of a conventional power supply system for a computer using a UPS. More particularly, UPS 14 containing a battery therein is connected to the commercial power supply 12, whereas power supply circuitry of computer 10 is connected to UPS 14. AC100 V generated by UPS 14 is converted to stabilized or regulated DC12 V by a power supply unit 16 provided within the computer 10. A portion of the DC12 V is fed to a DC/DC step-down converter 18 where it is converted to regulated DC5 V and DC3.3 V to be fed to a 5 V/3.3 V load 22, which includes memories and various driver circuits. (For brevity of description herein, the term "load" will be used hereafter in a singular form). Another portion of the DC12 V is fed to a DC/DC step-down converter 20 where it is converted to regulated DC2 V to be fed to a 2 V load 24, which includes a CPU. Yet another portion of the DC12 V is directly fed to a 12 V load 26, including a hard disk drive, liquid crystal display panel and the like, without intervention of any converter. Since the power supply unit 16 is provided with a function for regulating its output voltage, there should be no problem to directly feed the output voltage of the power supply unit 16 to the 12 V load 26 without intervention of any converter. Rather, it would be more efficient to do so because of the absence of a substantial loss in an inverter.

In Japanese Patent Publication No. 9-322433 (Japanese Patent Application No. 8-137879), there is disclosed a power supply system, wherein DC power is fed to a load in parallel at a predetermined ratio from both of a main power supply section and a UPS power supply section, thereby improving efficiency. Upon detection of a malfunction in one of the power supply sections or a power interruption, the other power supply section is rendered to immediately feed DC power, thereby improving reliability. However, a disadvantage with this system is that DC output voltages of the main power supply section and UPS power supply section are interconnected together to guarantee parallel running, and yet a DC/DC converter comprising UPS power supply section is always feeding DC power at a predetermined ratio.

In Japanese Utility Model Publication No. 5-20142 (Japanese Utility Model Application No. 3-67125), there is disclosed a power supply system, wherein both of a circuit for feeding power to a load when the commercial power supply is operatively working and a battery backup circuit for feeding power at the time of a power interruption are provided in parallel to the load at a secondary side of an A/D converter. Further, with respect to the battery backup circuit, a primary battery circuit of a lithium cell or the like and a secondary battery circuit of a capacitor or the like are connected to the load in parallel. Either one of the commercial power supply, primary battery and secondary battery, which should feed power to the load, is determined on the basis of voltage differences among them. However, this arrangement does not use a voltage converter for regulating an output voltage of the A/C converter, which results in a large allowable voltage variation range for the backup element (load), e.g., from 2 V to 5 V. Thus, this arrangement is not suitable for use with a load that has a strict allowable voltage range.

It is not expedient in terms of space for a UPS and cost involved to cope with a sudden variation of the commercial power supply by means of an externally provided UPS as seen in the conventional power supply system for a computer of FIG. 1. Because such a UPS is designed to convert an AC voltage of the commercial power supply to a DC voltage and then convert the same to an AC voltage again, it has a relatively large size and consumes energy during the course of voltage conversions, which renders it costly.

Also, modifying the circuitry of FIG. 1 without using UPS 14 in such a way that a backup power supply, comprising a charger and a rechargeable battery, is provided at a secondary side of the power supply unit 16 and an output of the rechargeable battery is connected to the DC12 V line, then at the time of a stoppage of the commercial power supply, an output voltage of the battery will be directly fed to the 12 V load 26 as well. In this case, a variation range of the output voltage of the battery will deviate from an allowable voltage variation range for the 12 V load 26 and, thus, it will result in a malfunction of the 12 V load 26. Here, in order to regulate the voltage fed from the battery to the 12 V load 26, such a modification may be further modified to provide a 12 V/12 V voltage converter dedicated to the 12 V load 26 in addition to the backup power supply, However, with respect to the 12 V load 26 in the latter modification, power will always be fed from the commercial power supply via the voltage converter and, hence, the latter modification is not expedient in terms of a power loss occurring at the voltage converter. Moreover, it is very difficult to manufacture such a 12 V/12 V voltage converter.

OBJECTS OF THE INVENTION

It is, therefore, an object of the present invention to provide an uninterruptable power supply of a simple configuration for use in an electronic device such as a desktop computer or the like that is powered by a normal power supply such as a commercial power supply or the like.

More particularly, it is an object of this invention to provide, in an electronic device including electronic components to be powered without recourse to a DC/DC converter, an efficient uninterruptable power supply, which is configured to back up a DC voltage fed to each electronic component by a power supply other than the commercial power supply such as a battery or the like and, if there occurs a power disturbance in the normal power supply, to feed a regulated voltage to a load without an intervening DC/DC converter.

Further, it is another object of this invention to provide an electronic device such as a desktop computer or the like, which is operative by virtue of provision of the uninterruptable power supply, even in a situation where an internal DC voltage varies due to a sudden occurrence of a disturbance in the normal power supply, to maintain a regulated voltage for a certain period and to stop feeding power to the electronic components after completion of an off-sequence.

SUMMARY OF THE INVENTION

The present invention is directed to an uninterruptable power supply for feeding power from a normal power supply as a first power supply to a first load to be operated at a first DC voltage and a second DC voltage lower than the first DC voltage. The uninterruptable power supply includes a power supply unit, having an output connected to the first load for converting a voltage of the normal power supply to the first DC voltage and for outputting the same. The UPS also includes a first voltage converter, having an input connected to the second power supply and an output connected to the first load, for converting an output voltage of the second power supply to the second DC voltage and for outputting the same. If a characteristic of the normal power supply is deviated from a defined value, the UPS is operative to continue feeding power from a second power supply (e.g., a battery) in place of the first power supply to the first load.

If the characteristic of the normal power supply is within the defined value, the first DC voltage generated by the power supply unit is supplied to the first load via the first voltage converter. Since the second DC voltage that is an output of the first voltage converter is lower than the first DC voltage, the first voltage converter does not output any current and it is capable of waiting in a no-load state. While the first load is being powered by the normal power supply, the first voltage converter is in a no-load state and, thus, its power loss is almost negligible. On the other hand, if the characteristic of the normal power supply is deviated from the defined value, feeding power from the power supply unit is stopped. If a value of the first DC voltage fed from the power supply unit is lowered due to the stoppage of the normal power supply and if it reaches a value of the second DC voltage, then the first voltage converter that has been in the no-load/waiting state starts to output a current to the first load and to maintain a voltage fed to the first load at the second DC voltage.

Even when a power source is instantaneously switched from the normal power supply to the battery, the first voltage converter is in the no-load/waiting state and, thus, a voltage fed to the first load does not fall below the second DC voltage. Since the first load operates at both of the first DC voltage and second DC voltage, such a load connected to the uninterruptable power supply of this invention does not malfunction due to a voltage variation.

Another embodiment of the present invention provides an uninterruptable power supply for feeding power from a normal power supply to a first load to be operated at both of a first DC voltage and a second DC voltage lower than the first DC voltage, and to a second load to be operated at a third DC voltage. In this embodiment, the uninterruptable power supply includes a power supply unit for converting a voltage of the normal power supply to the first DC voltage and for outputting the same. A first rectifying element has one terminal connected to an output of the power supply unit and another terminal connected to the first load. A first voltage converter has an input connected to a battery and an output connected to the first load, for converting an output voltage of the battery to the second DC voltage and for outputting the same. A second voltage converter has an input connected to the output of the power supply unit and an output connected to the second load, for converting the first DC voltage to the third DC voltage and for outputting the same. The UPS also includes a second rectifying element having one terminal connected to the battery and another terminal connected to an input of the second voltage converter. If a characteristic of the normal power supply is deviated from a defined value, the UPS is operative to continue feeding power from the battery to the first load and the second load.

Next, we will describe the operation of this invention with respect to supplying power to the second load in such a state where the first load, the second load and the battery are connected to the uninterruptable power supply. For the first load, power feeding is continued in the same manner as already described in connection with the first embodiment. If the characteristic of the normal power supply is within the defined value, the first DC voltage generated by the power supply unit is fed to the second load via the second voltage converter. While the normal power supply is supplying power, the second rectifying element is in an off state, thereby preventing the first voltage from being applied to the battery and an input of the first voltage converter.

On the other hand, if the characteristic of the normal power supply deviates from the defined value and, thus, power feeding from the power supply unit is stopped, a value of an input voltage of the second voltage converter starts to be lowered from a value of the first DC voltage and eventually is lowered below the output voltage of the battery. At this instant, the second rectifying element is turned on thereby preventing an input voltage of the second voltage converter from being lowered below the output voltage of the battery. Accordingly, if the output voltage of the battery is selected to come within an allowable variation range for the input voltage of the second voltage converter, then even when a power source is instantaneously switched from the normal power supply to the battery, the second load does not malfunction due to a voltage variation that exceeds an allowable range.

BRIEF DESCRIPTION OF THE DRAWINGS

FIG. 6 is a timing chart showing operations of the UPS of FIG. 5.

DETAILED DESCRIPTION OF THE INVENTION

Figure 2:
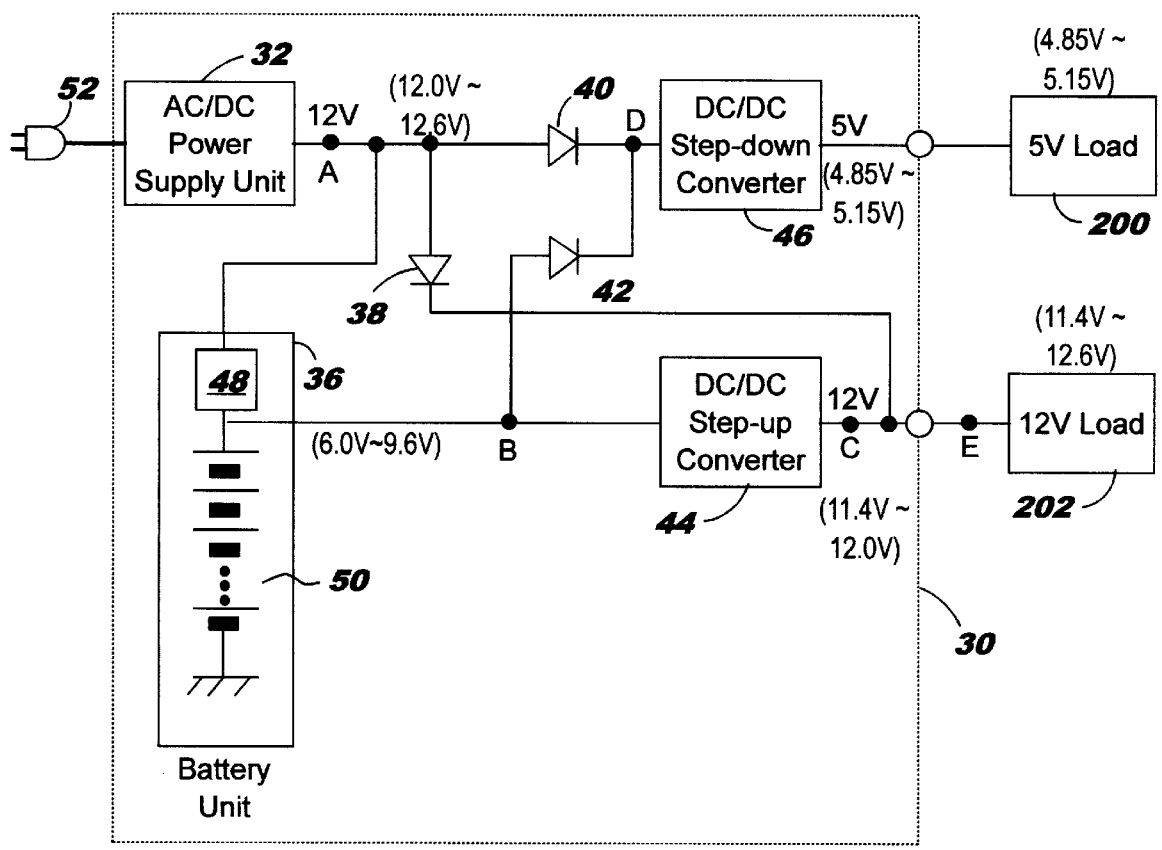
FIG. 2 is a schematic block wiring diagram illustrating major components of a UPS in accordance with the present invention.

FIG. 2 is a schematic block wiring diagram of major components of a UPS 30 in accordance with the present invention. More particularly, an AC/DC power supply unit 32 rectifies AC100 V of the commercial power supply accepted from a power plug 52 and converts the same into DC12 V. The power supply unit 32 is provided with a voltage regulation function which generates an output voltage within a fixed variation range even if an input voltage varies within a predetermined range. As a result, the output voltage is maintained in a range of from DC12.0 V to DC12.6 V (DC12 V: –0%, +5%). An anode of a diode 40 is connected to an output of the power supply unit 32 as a rectifier, and the cathode of diode 40 is connected to an input of a DC/DC step-down converter 46. The converter 46 converts an input voltage ranging from DC6 V to DC12 V to a regulated voltage ranging from DC4.85 V to DC5.15 V (DC5 V: –3%, +3%), and feeds the same to a 5 V load 200. The 5 V load 200 operates in its allowable voltage variation range of from DC4.85 V to DC5.15 V.

The output of the power supply unit 32 is also connected to an input of a battery unit 36 which comprises a charge control circuit 48 and a rechargeable battery 50. The battery 50 is a battery pack comprising 6 nickel-hydoride (Ni—MH) battery cells serially connected, and it is detachably mounted on the battery unit 36. The battery unit 36 charges the battery 50 while the charge control circuit 48 is accepting power from the power supply unit 32, whereas it feeds the charged power to the battery 50 while power supplied from the power supply unit 32 is being stopped. Each of the nickel-hydoride battery cells exhibits DC1.6 V in its fully charged state, and at the time of discharging, it is used until its output voltage reaches about DC1.0 V in view of battery life and of discharge voltage characteristics. Accordingly, an output voltage of the entire battery pack ranges from DC6 V to DC9.6 V when UPS 30 is in use.

The charge control circuit 48 and battery 50 are connected to an input of a DC/DC step-up converter 44 and an anode of a diode 42 respectively. An output of the converter 44 is connected to a 12 V load 202, whereas a cathode of diode 42 is connected to the input of the converter 46. The 12 V load 202 operates in its allowable voltage variation range of from DC11.4 V to DC12.6 V. The converter 44 converts an input voltage ranging from DC6 V to DC9.6 V to a regulated voltage ranging from DC11.4 V to DC12.0 V (DC12 V: –5%, +0%). Further, the output of the power supply unit 32 is connected to a anode of a diode 38, whereas a cathode of diode 38 is connected to the output of the converter 44, that is, the 12 V load 202.

Summary of Operation of UPS 30

When a stable voltage of the commercial power supply is being fed to the power supply unit 32, it feeds power to the 5 V load 200 via diode 40 and converter 46. At the same time, unit 32 provides power to the 12 V load 202 via diode 38, and unit 32 also provides power to the charge control circuit 48 for charging the battery 50. Whenever the battery 50 is in an overdischarge state, the charge control circuit 48 enters a trickle charge mode for charging the battery 50 by using a relatively small current. When charging up to a certain level is accomplished, then the charge control circuit 48 enters a rapid charge mode to fully charge the battery 50. Thereafter, the charge control circuit 48 enters an intermittent charge mode to compensate for natural discharge in order to maintain the fully charged state. If the commercial power supply stops, then the battery unit 36 feeds power to the converter 46 via diode 42, and it also feeds power to the 12 V load 202 via the converter 44. Details of switching from the commercial power supply to the battery power supply will be described below. It is noted here that UPS 30 in accordance with the present invention is arranged to feed both of a first DC voltage, which is generated by rectifying an AC voltage of the commercial power supply by the power supply unit 32, and a second DC voltage, which is generated by converting a voltage of the battery power supply by the converter 44, to the 12 V load 202 respectively. Whichever of these voltages is applied to the 12 V load 202 must be controlled to come within a predetermined allowable variation range.

Setup Voltages of Converters

Figure 1:
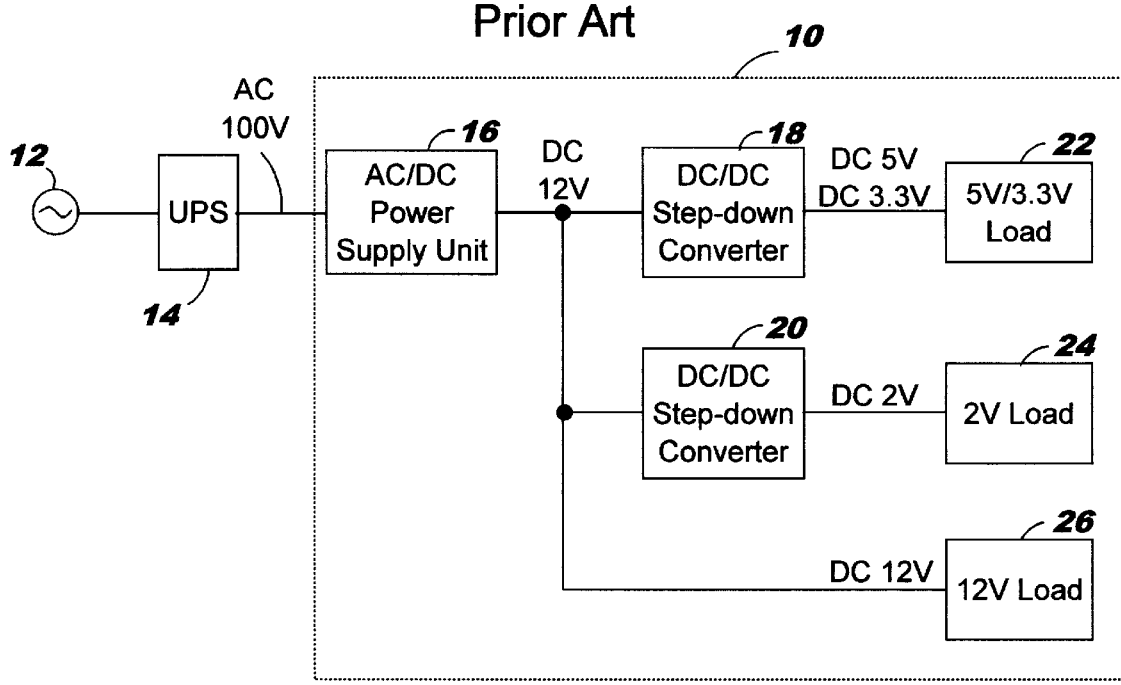
FIG. 1 is a schematic block wiring diagram of a power supply system for a computer using a conventional UPS.
Figure 3:
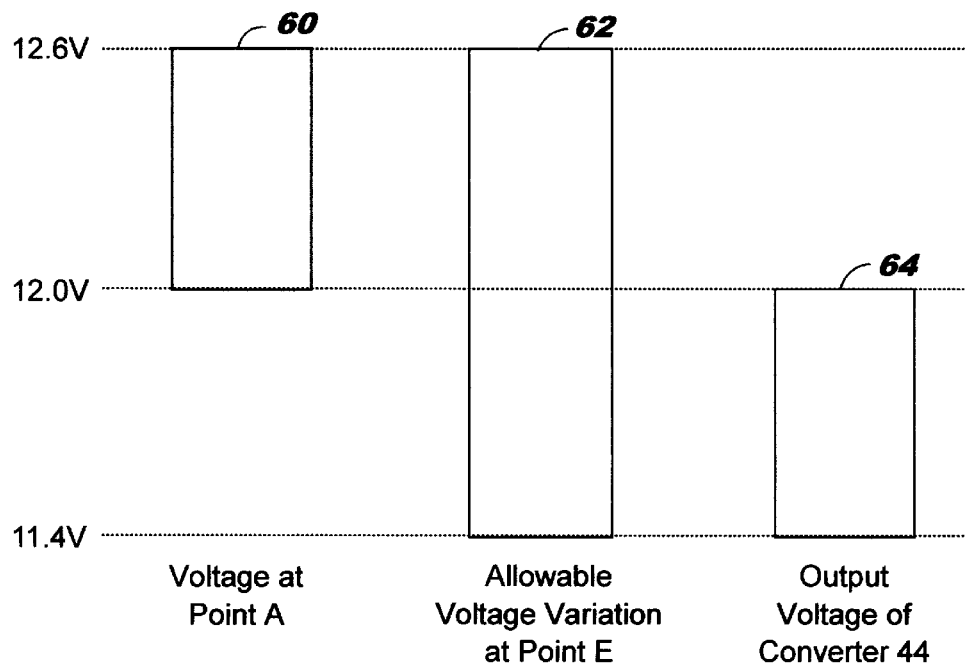
FIG. 3 is a diagram illustrating setup voltages of converters used in a UPS in accordance with the present invention.

Next, with reference to FIG. 3, those voltages fed to the 12 V load 26 will be described in detail. When UPS 30 is being powered by the commercial power supply, FIG. 3 comparatively shows a variation range 60 of an output voltage of the power supply unit 32 at point A, a variation range 64 of an output voltage of the converter 44, and an allowable voltage variation range 62 for the 12 V load 26 at point E respectively. As shown in FIG. 3, the variation range 60 of the output voltage of the power supply unit 32 is set up such that it is always higher than the variation range 64 of the output voltage of the converter 44. Also, the maximum value 12.6 V of the output voltage of the power supply unit 32 and the minimum value 11.4 V of the output voltage of the converter 44 are set up such that they come within the allowable voltage variation range for the 12 V load 202.

Operation When Power is Supplied from the Commercial Power Supply

Accordingly, when the commercial power supply is feeding power to the loads, a voltage at point B is in a range of from 6.0 V to 9.6 V, and an input voltage of the converter 46 at point D is always higher than the voltage at point B, whereby no current flows from the battery 50 to the converter 46 via diode 42. Also, disregarding a voltage drop across diode 38, the output voltage of the converter 44 is always lower than the voltage at point A as shown in FIG. 3 and, thus, no current flows from the converter 44 toward point C. Accordingly, the power supply unit 32 alone feeds power to the 12 V load 202 via diode 38. While, at this time, the converter 44 accepts the voltage from the battery 50 at its input side, it is in a state that does not output any current from its output side. Namely, the converter 44 is in a no-load/waiting state. This no-load/waiting state is effective for reducing a loss of the converter 44 during power feeding from the commercial power supply, and at the same time, it is also effective for preventing a large voltage variation from being given to the 12 V load 202 during a switching operation at the time of a power interruption to be described below.

Operation at Switching from Commercial Power Supply to Battery

Next, will be described operations that occur at the time of a stoppage of the commercial power supply and switching to the battery 50. Whenever the commercial power supply stops, the voltage at point A decreases within a short period. Assuming that, before the power interruption, the battery 50 is in its fully charged state and its voltage is maintained at 9.6 V, an extremely small current flows from the charge control circuit 48 as a no-load current of the converter 44. In accordance with the decrease of the voltage at point A, the voltage at point D gradually decreases until it becomes equal to the voltage at point B. At this instant, diode 42 is turned on and, thus, a current starts to flow from point B to point D. Since the battery 50 and diode 42 are selected to have sufficient capacities with respect to the converter 46 and the 5 V load 200 connected thereto, even when a power source is switched from the commercial power supply to the battery 50, the voltage at point D comes within an allowable variation range of the input voltage of the converter 46, thereby enabling the converter 46 to continually feed a stable output voltage to the 5 V load 200.

Disregarding a voltage drop across diode 38, the voltage at point C before the power interruption is equal to the voltage at point A. However, immediately after the power interruption, the voltage at point C starts to decrease and whenever it becomes equal to the output voltage of the converter 44, the converter 44 starts to feed a current to the 12 V load 202 via point C. Since the converter 44 was in the no-load/waiting state before the power interruption, whether or not the converter 44 feeds a current is solely determined by a relation between the voltage at point C (which is determined by the output voltage of the power supply unit 32) and the output voltage of the converter 44. In other words, even when a power source to the 12 V load 202 is instantaneously switched from the commercial power supply to the battery power supply, the voltage at point C never drops below the output voltage of the converter 44.

Next, another implementation of the circuitry shown in FIG. 2 will be described. While the power supply unit 32 is feeding a voltage to the converter 46, diode 42 prevents such a voltage from being applied to the battery 50. On the other hand, while the battery 50 is feeding a voltage to the converter 44, diode 38 prevents an output current of the converter 44 from reversely flowing to the power supply unit 32. Accordingly, diode 42 or diode 38 may be replaced by a switch comprising a FET or the like, which is responsive to a signal indicating a condition that switching to the battery power supply is to be carried out at a power interruption of the commercial power supply. Further, while the normal power supply is being stopped, diode 40 prevents an output voltage of the battery 50 from being applied to the power supply unit 32. Diode 40 may be provided internally to the power supply unit 32 or at a point immediately after its output.

Figure 4:
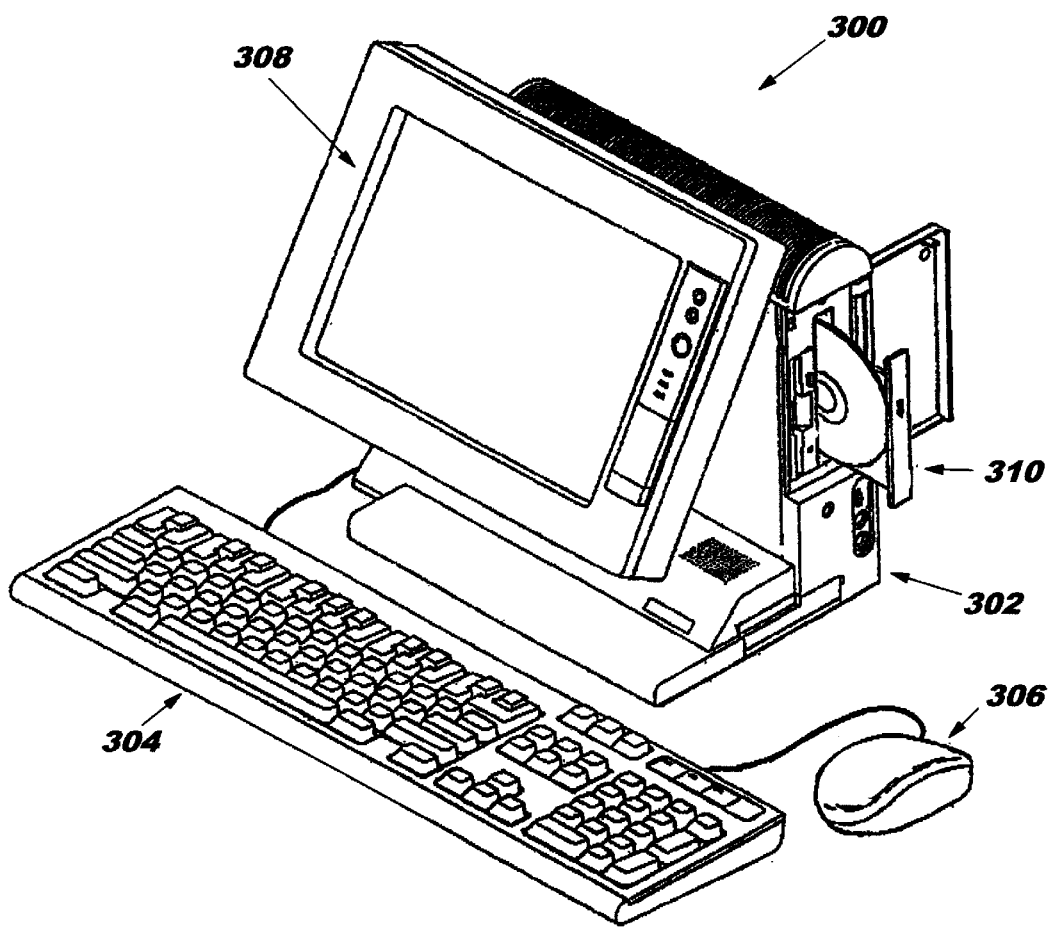
FIG. 4 is an exterior view of a desktop computer that incorporates a UPS in accordance with the present invention.

FIG. 4 shows an exterior view of a desktop computer 300 that incorporates a UPS 30 in accordance with the present invention. The computer 300 of FIG. 4 comprises a system unit 302, a keyboard 304 and a mouse, each being interconnected together, as well as a liquid crystal display panel 308 and a CD-ROM drive 310, each being embedded in a portion of the system unit 302. Also, a power cable with a plug (not shown) is connected to the system unit 302 such that the computer 300 is normally powered by using the commercial power supply. Within the system unit 302, there are provided a number of electronic components. A UPS 30 in accordance with the present invention can be incorporated into system unit 302 in order to feed power to such electronic components for operating the computer 300.

Of the electronic components provided within the system unit 302, the 5 V load to be operated at a nominal voltage of DC5 V includes an Ethernet card for communication, an I/O card, Integrated Device Electronics (IDE) cards for a hard disk drive, a CD-ROM drive, a floppy disk drive and the like. The 3.3 V load to be operated at a nominal voltage of DC3.3 V includes a memory, a CPU bus card, a video card, a card bus controller and the like. The 2 V load to be operated at a nominal voltage of DC2 V includes a CPU. Finally, the 12 V load to be operated at a nominal voltage of DC12 V includes a hard disk drive and a liquid crystal display panel.

Figure 5:
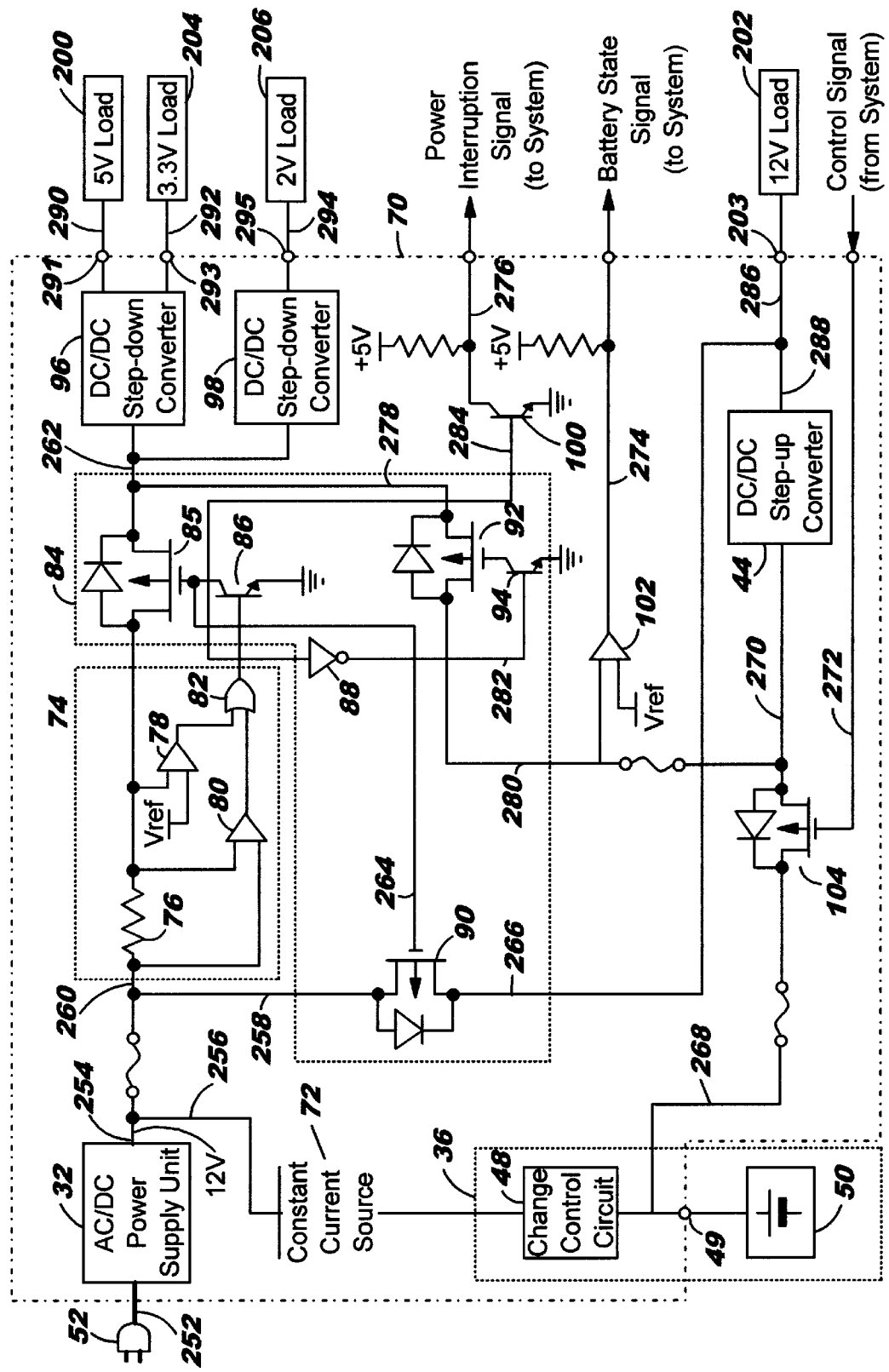
FIG. 5 is a block diagram illustrating a UPS in accordance with another embodiment of the present invention.

FIG. 5 shows a block wiring diagram of another embodiment of a UPS 70 in accordance with the present invention. The UPS 70 is applied to the computer 300 of FIG. 4. Note that each element shown in FIG. 5, which has the same reference number as its corresponding element of FIG. 2, will be described in a simpler manner or its description will be omitted from the text below.

Circuitry Configuration of FIG. 5

An input voltage of AC100 V fed from the commercial power supply through line 252 is converted by the power supply unit 32 to DC12 V on line 254, which is then fed to the battery unit 36 through line 256, to the 12 V load 202 through line 258, and to the 5 V load 200, the 3.3 V load 204 and the 2 V load 206 through line 260 respectively. Electronic components, included in each of the loads 200, 204, 206 and 202, are connected to a power switch that is controlled by the system, whereby after respective voltages are applied to lines 290, 292, 294 and 286, the switch is turned on in accordance with an instruction of the system to start their operations.

An output of the power supply unit 32 is connected to one terminal of a resistor 76 and a first input terminal of an operational amplifier 80, which constitute a power interruption detection circuit 74. Another terminal of the resistor 76 is connected to a second input terminal of the operational amplifier 80, a first input terminal of an operational amplifier 78 and a drain of a P channel MOSFET 85 (hereafter called "PMOS") in a power interruption switching circuit 84 respectively. A reference voltage source for determining a reference value of a voltage drop is connected to a second input terminal of the operational amplifier 78. Output terminals of the operational amplifiers 78 and 80 are connected to first and second input terminals of an OR logic circuit 82. An output terminal of the OR logic circuit 82 is connected to a base of a transistor 86, a base of a transistor 100 and an input of a NOT logic circuit 88 respectively. An emitter of transistor 100 is grounded, whereas its collector is connected to a voltage source of +5 V, thereby outputting a power interruption signal to the computer system via line 276. An output of the NOT logic circuit 88 is connected to a base of a transistor 94.

A source of PMOS 85 is connected to an input terminal of a DC/DC step-down converter 96, an input terminal of a DC/DC step-down converter 98 and a source of a PMOS 92 respectively. The converter 96 converts an input voltage, ranging from DC6 V to DC12 V, to voltages having nominal values of DC5 V and DC3.3 V respectively, and feeds power to the 5 V load 200 and the 3.3 V load 204 via load terminals 291 and 293 respectively. Similarly, the converter 98 converts an input voltage, ranging from DC6 V to DC12 V, to a voltage having a nominal value of DC2 V, and feeds power to the 2 V load 206 via load terminals 295. The converters 96 and 98 feed regulated voltages in a range of from −3% to +3% with respect to nominal output voltage values respectively, thereby satisfying allowable variation ranges for the respective load voltages.

In each of PMOS 85 and other PMOSs used in the present embodiment, a parasitic capacitance is formed in a conducting direction from a drain to a source. However, for sake of brevity of description herein, such a parasitic capacitance is only shown in the drawing without any accompanying description. A gate of PMOS 85 is connected to a gate of a PMOS 90 and a base of transistor 86. A drain of a PMOS 92 is connected to a drain of a PMOS 104 and a first input terminal of an operational amplifier 102. A second input terminal of the operational amplifier 102 is connected to a reference voltage for determining a voltage of the battery 50 is established, whereas its output terminal is connected to a voltage source of +5 V, outputs a battery state signal to the computer system by way of line 274. A collector of transistor 94 is connected to a gate of PMOS 92, and its emitter is grounded. A drain of PMOS 90 is connected to the output of power supply unit 32, whereas its source is connected to a load terminal 203.

Further, to the output of the power supply unit 32, an input of a constant current source 72 is connected, an output of which is connected to the battery unit 36. While the charge control circuit 48 is carrying out the trickle charging or rapid/intermittent charging, the constant current source 72 feeds a constant current at a value appropriate for a respective charging mode, thereby preventing the battery life from being shortened. The battery pack 50 connected to the charge control circuit 48 may be mounted within the system unit 302 in such a way that it is detachable with respect to UPS 70, and it may be replaced by another one whenever it is degraded and its battery capacity is lowered. A terminal of the battery 50 is connected to a source of PMOS 104, whereas its drain is connected to the input of the DC/DC step-up converter 44. The output of the converter 44 is connected to the 12 V load 202, and feeds power of nominal DC12 V to this load 202. To a gate of PMOS 104, a control signal is provided from the system through line 272.

Next, the operation of the UPS 70 shown in the block wiring diagram of FIG. 5 will be described using a timing chart of FIG. 6.

At time t0, if the power plug 52 is connected to the commercial power supply, the power supply unit 32 is operated to generate a voltage, ranging from DC12.0 V to DC12.6 V, on line 254. The voltage on line 254 is detected by the operational amplifier 78 through line 260, which causes the output of the OR logic circuit 82 to be high and, thus, transistor 86 is operated to make line 264 low. Since, at this time, the loads 200, 204, 206 and 202 are not operated yet and there is no voltage drop across the resistor 76, the output of the operational amplifier 80 is in a low state. As the output of the OR logic circuit 82 becomes low, PMOS 85 and PMOS 90 are turned on to generate voltages of nominal DC12 V on lines 262 and 286 respectively. Then, voltages are applied to lines 290 and 292 through the step-down converter 96, a voltage is applied to line 294 through the step-down converter 98, and a voltage is applied to line 286 through PMOS 90.

At this point of time, PMOS 92 and PMOS 104 are still in an off state. Next, at time t1, if the power switch attached to the system unit 302 is turned on to operate the computer 300, the system supplies a low signal on line 272 to cause PMOS 104 to be turned on and, at the same time, the computer 300 automatically reads an initiator program stored in a ROM to execute a setup sequence and to cause each of the loads to be operated by a predetermined procedure. If the battery 50 is in its fully charged state, the voltage on line 268 is at DC9.6 V, which is applied to the converter 44 via line 270 for generating a voltage, ranging from DC11.4 V to DC12.0 V, at its output. However, since a voltage on line 266 or line 286 is higher than the output voltage of the converter 44, line 288 does not accept any current flowing from the converter 44, nor does the converter 44 accept any current flowing from line 266 due to a backward current prevention circuit embedded therein. Further, since a voltage on line 280 becomes equal to the voltage on line 268, the operational amplifier 102 detects that the voltage on line 280 is higher than the reference voltage and informs the system through line 274 of the fact that a backup ready state by the battery 50 has been completed. On the system side, this signal may be sent to an indicator provided on a surface of the computer 300 for notifying an operator of this state.

If, at time t2, the commercial power supply is lost and a voltage on line 252 drops, the power supply unit 32 is not able to maintain a voltage on line 254 at a predetermined value any longer and, in response thereto, a voltage on line 260 drops and a current flowing on line 260 decreases. Accordingly, a current flowing through the resistor 76 decreases to cause the output of the operational amplifier 80 to become low, and the first input of the operational amplifier 78 drops below a voltage of the reference voltage source connected to the second input of the operational amplifier 78, whereby the output of the OR logic circuit 82 is changed from high to low. If a varying output voltage of the power supply unit 32 comes within an allowable variation range of an input voltage of the step-down converter 96, and only if a current is flowing through the resistor 76, the operational amplifier 80 functions to prevent the OR logic circuit 82 from being operated. An output signal of the OR logic circuit 82 on line 284 causes transistor 100 to be operated, which in turn provides a power interruption signal to the computer system via line 276. After receiving the power interruption signal, the system suspends a job in process, saves data stored in a memory to a hard disk, and starts a predetermined off-sequence for stopping the computer 300.

Also, since transistor 86 is turned off, a signal on line 264 becomes high, which causes both of PMOS 85 and PMOS 90 to be turned off. Further, since a high output of the NOT logic circuit 88 is provided to transistor 94 via line 282, transistor 94 is turned on and, thus, PMOS 92 is turned on as well. While, at point of time t2, a voltage on line 262 starts to drop, such a voltage drop is stopped whenever a voltage on line 278 becomes equal to a voltage on line 280, whereupon a power source to line 262 is switched from the power supply unit 32 to the battery 50. During a period from the occurrence of a power interruption to turning on of PMOS 92, the parasitic capacitance formed between drain/source of PMOS 92 for preventing a voltage drop on line 262 feeds a current on line 262. It is not feasible to feed a current from line 280 to line 278 through the parasitic capacitance of PMOS 92 for a long period due to a large voltage drop and an insufficient current capacity. However, such a problem may be solved since PMOS 92 is turned on after a slight time delay.

If, at time t2, a power interruption occurs, a voltage on line 266 drops as well. When a voltage on line 266 or line 286 becomes lower than the output voltage of the converter 44, the converter 44 starts to feed a current on line 288, thereby maintaining a voltage on line 288 in a range from DC11.4 V to DC12.0 V. While a voltage of the battery 50 on line 268 gradually decreases as the battery feeds power, the voltage on line 286, as well as voltages on lines 290, 292 and 294 are maintained within predetermined ranges by the respective converters.

While the system is executing an off-sequence, voltages of electronic components included in each of the loads are maintained by the converters 96, 98 and 44, each being fed by the battery 59. Thus, the system is capable of completing the off-sequence without any glitches. After data and programs are stored in a hard disk in a predetermined sequence, the system provides, at time t3, a high control signal on line 272 to cause PMOS 104 to be turned off, thereby to stop feeding power by the battery 50. Using an operating system (OS) available from Microsoft Corporation such as "Windows95" or "Windows98", it is preferable to estimate that a power interruption sequence in accordance with the present invention takes 3 minutes at most. Accordingly, the battery 50 is selected to have a capacity that is sufficient for feeding power to the loads for more than 3 minutes. If the voltage of the commercial power supply recovers, the charge control circuit 48 starts to charge the battery 50 in preparation for the next power interruption.

While the UPS in accordance with the present invention has been exemplified above as being incorporated into a desktop computer, it will be readily understood by those skilled in the art that the present invention may be applied to a generic electronic device other than a desktop computer. Such an electronic device may be powered by a normal power supply such as the commercial power supply or the like, which can directly feed a DC voltage, rectified and generated from the commercial power supply by the power supply unit, to a load included in at least a portion of electronic components without intervention of any converter.

The present invention has made it possible to provide an uninterruptable power supply of a simple configuration for use in an electronic device such as a desktop computer or the like that is powered by a normal power supply such as the commercial power supply or the like. Also, in an electronic device including electronic components to be powered without recourse to a DC/DC converter, this invention has made it possible to provide an uninterruptable power supply of efficient performance, which is configured to back up a DC voltage fed to each electronic component by a second power supply such as a battery or the like and, if there occurs a power disruption in the normal power supply, to feed a regulated voltage to a load without an intervening DC/DC converter. Further, by virtue of provision of the uninterruptable power supply, this invention has made it possible to provide an electronic device such as a desktop computer or the like, which is operative, even in a situation where an internal DC voltage varies due to sudden occurrence of a disturbance in the normal power supply, to maintain a regulated voltage for a certain period and to stop feeding power to the electronic components after completing an off-sequence.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. An uninterruptable power supply for feeding power from a normal power supply as a first power supply to a first load to be operated within a defined DC voltage range comprising:

a power supply unit, having an output connected to the first load, for converting a voltage of the normal power supply to a first DC voltage within the defined DC voltage range and for outputting the same;

a first voltage converter, having an input connected to a second power supply and an output connected to the first load, for converting an output voltage of the second power supply to a second DC voltage within the defined DC voltage range and lower than the first DC voltage and for outputting the same; and wherein if a characteristic of the normal power supply is deviated from a defined value, said uninterruptable power supply is operative to continue feeding power from the second power supply in place of the first power supply to the first load.

2. The uninterruptable power supply of claim 1, wherein the second power supply is a battery power supply.

3. An uninterruptable power supply for providing power from a normal power supply to a first load to be operated within a defined DC voltage range comprising:

a power supply unit for converting a voltage of the normal power supply to a first DC voltage within the defined DC voltage range and for outputting the same;

a switch, having one terminal connected to an output of the power supply unit and another terminal connected to the first load, the switch being operated in response to a signal indicating that the characteristic of the normal power supply has deviated from the defined value;

a first voltage converter, having an input connected to a battery power supply and an output connected to the first load, for converting an output voltage of the battery power supply to a second DC voltage within the defined DC voltage range and lower than the first DC voltage and for outputting the same; and wherein if a characteristic of the normal power supply is deviated from a defined value, said uninterruptable power supply is operative to continue feeding power-from the battery power supply to the first load.

4. An uninterruptable power supply for feeding power from a normal power supply to a first load to be operated within a defined DC voltage range encompassing both of a first DC voltage and a second DC voltage lower than the first DC voltage, and to a second load to be operated at a third DC voltage comprising:

a power supply unit for converting a voltage of the normal power supply to the first DC voltage and for outputting the same;

a first rectifying element, having one terminal connected to an output of the power supply unit and another terminal connected to the first load;

a first voltage converter, having an input connected to a battery and an output connected to the first load, for converting an output voltage of the battery to the second DC voltage and for outputting the same;

a second voltage converter, having an input connected to the output of the power supply unit and an output connected to the second load, for converting the first DC voltage to the third DC voltage and for outputting the same;

a second rectifying element, having one terminal connected to the battery and another terminal connected to an input of the second voltage converter; and wherein if a characteristic of the normal power supply is deviated from a defined value, said uninterruptable power supply is operative to continue feeding power from the battery to the first load and the second load.

5. The uninterruptable power supply of claim 4, wherein the first voltage converter is replaced by a switch that is operated in response to a signal indicating that the characteristic of the normal power supply has deviated from the defined value.

6. The uninterruptable power supply of claim 5, wherein the second voltage converter is replaced by a switch that is operated in response to a signal indicating that the characteristic of the normal power supply has deviated from the defined value.

7. An uninterruptable power supply for feeding power from a normal power supply to a first load to be operated within a defined DC voltage range encompassing both of a first DC voltage and a second DC voltage lower than the first DC voltage, and to a second load to be operated at a third DC voltage comprising:

a power supply unit for converting a voltage of the normal power supply to the first DC voltage and for outputting the same;

a first FET, having a drain connected to an output of the power supply unit, a source connected to the first load and a gate accepting a signal indicating that the characteristic of the normal power supply has been deviated from the defined value;

a first voltage converter, having an input connected to a battery and an output connected to the first load, for converting an output voltage of the battery to the second DC voltage and for outputting the same;

a second voltage converter, having an input connected to the output of the power supply unit and an output connected to the second load, for converting the first DC voltage to the third DC voltage and for outputting the same;

a second FET, having a drain connected to the battery, a source connected to an input of the second voltage converter and a gate accepting the signal indicating that the characteristic of the normal power supply has been deviated from the defined value;

a battery charge control circuit, having an input connected to the power supply unit and an output connected to the battery terminal; and wherein if a characteristic of the normal power supply is deviated from a defined value, said uninterruptable power supply is operative to continue feeding power from the battery to the first load and the second load.

8. The uninterruptable power supply of claim 7, further comprising a power interruption detection circuit for detecting the first DC voltage and generating a signal in accordance with a voltage magnitude with respect to a reference voltage.

9. An electronic device comprising:

a first load to be operated within a defined DC voltage range encompassing a first DC voltage and a second DC voltage lower than the first DC voltage;

an uninterruptable power supply for accepting power from an operating normal power supply to feed the power to the first load, said uninterruptable power supply including:

a power supply unit for converting a voltage of the normal power supply to the first DC voltage and for outputting the same;

a switch, having one terminal connected to an output of the power supply unit and another terminal connected to the first load, the switch being operated in response to a signal indicating that the characteristic of the normal power supply has deviated from the defined value;

a first voltage converter, having an input connected to a battery power supply and an output connected to the first load, for converting an output voltage of the battery power supply to the second DC voltage and for outputting the same; and wherein if a characteristic of the normal power supply is deviated from a defined value, said uninterruptable power supply is operative to continue feeding power from the battery power supply to the first load.

10. An electronic device comprising:

a first load to be operated at a first DC voltage and a second DC voltage lower than the first DC voltage;

a second load to be operated at a third DC voltage;

an uninterruptable power supply including:

a power supply unit for converting a voltage of the normal power supply to the first DC voltage and for outputting the same;

a first rectifying element, having one terminal connected to an output of the power supply unit and another terminal connected to the first load;

a first voltage converter, having an input connected to a battery and an output connected to the first load, for converting an output voltage of the battery to the second DC voltage and for outputting the same;

a second voltage converter, having an input connected to the output of the power supply unit and an output connected to the second load, for converting the first DC voltage to the third DC voltage and for outputting the same;

a second rectifying element, having one terminal connected to the battery and another terminal connected to an input of the second voltage converter; and wherein if a characteristic of the normal power supply is deviated from a defined value, said UPS is operative to continue feeding power from the battery to the first load and the second load.

* * * * *